United States Patent [19]

Lech, Jr.

[11] Patent Number: 4,615,426
[45] Date of Patent: Oct. 7, 1986

[54] CLUTCH DRIVEN PLATE ASSEMBLY

[75] Inventor: Thaddeus Lech, Jr., Farmington Hills, Mich.

[73] Assignee: Borg-Warner Corporation, Chicago, Ill.

[21] Appl. No.: 556,518

[22] Filed: Nov. 30, 1983

[51] Int. Cl.⁴ .................. F16D 3/14; F16D 13/68
[52] U.S. Cl. .................. 192/106.2; 192/70.17; 192/30 V
[58] Field of Search ............ 192/106.2, 106.1, 55, 192/70.17, 107 C, 109 R, 109 D, 30 V, 41 S, 45.1; 464/68, 57, 66

[56] References Cited

U.S. PATENT DOCUMENTS

| | | | |
|---|---|---|---|
| 1,807,798 | 6/1931 | Short | 74/574 |
| 2,745,268 | 5/1956 | Reed | 64/27 |
| 2,753,028 | 7/1956 | Dodge | 192/45.1 |
| 2,853,862 | 9/1958 | Thelander | 64/27 |
| 3,252,300 | 5/1966 | Hofmann | 64/27 |
| 3,375,911 | 4/1968 | Smirl | 192/70.17 X |
| 3,948,373 | 4/1976 | Wörner | 192/70.17 X |
| 4,043,437 | 8/1977 | Taylor | 192/13 R |
| 4,046,237 | 9/1977 | Root et al. | 192/13 R |
| 4,068,749 | 1/1978 | Antrim | 192/106.1 |
| 4,222,475 | 9/1980 | Fenart | 192/106.2 |
| 4,241,818 | 12/1980 | Miller | 192/55 |
| 4,418,812 | 12/1983 | Lech, Jr. | 192/30 V X |
| 4,446,955 | 5/1984 | Lech, Jr. | 192/70.17 X |
| 4,461,376 | 7/1984 | Lech, Jr. et al. | 192/70.17 X |

Primary Examiner—Larry Jones
Attorney, Agent, or Firm—James A. Geppert

[57] ABSTRACT

A clutch driven plate assembly for use in an automotive vehicle adapted to dissipate the irregular impulses of the vehicle internal combustion or diesel engine when the transmission is in neutral, the clutch is engaged and the engine is at idle rpm. The assembly includes a clutch plate, a spring retainer plate secured to the clutch plate, and a hub in operative engagement with the transmission input shaft and having an integral hub flange with spring windows opened to allow an additional rotational travel of the clutch and spring retainer plates relative to the hub. A retainer is journalled on the hub so as to rotate with the clutch plate and has a plurality of equally spaced recesses facing the hub and receiving compression springs and plungers biased by the springs into engagement with complementary recesses formed in the hub flange. Rotation of the clutch plate and retainer relative to the hub causes the plungers to be cammed out of the recesses against the force of the compression springs.

13 Claims, 8 Drawing Figures

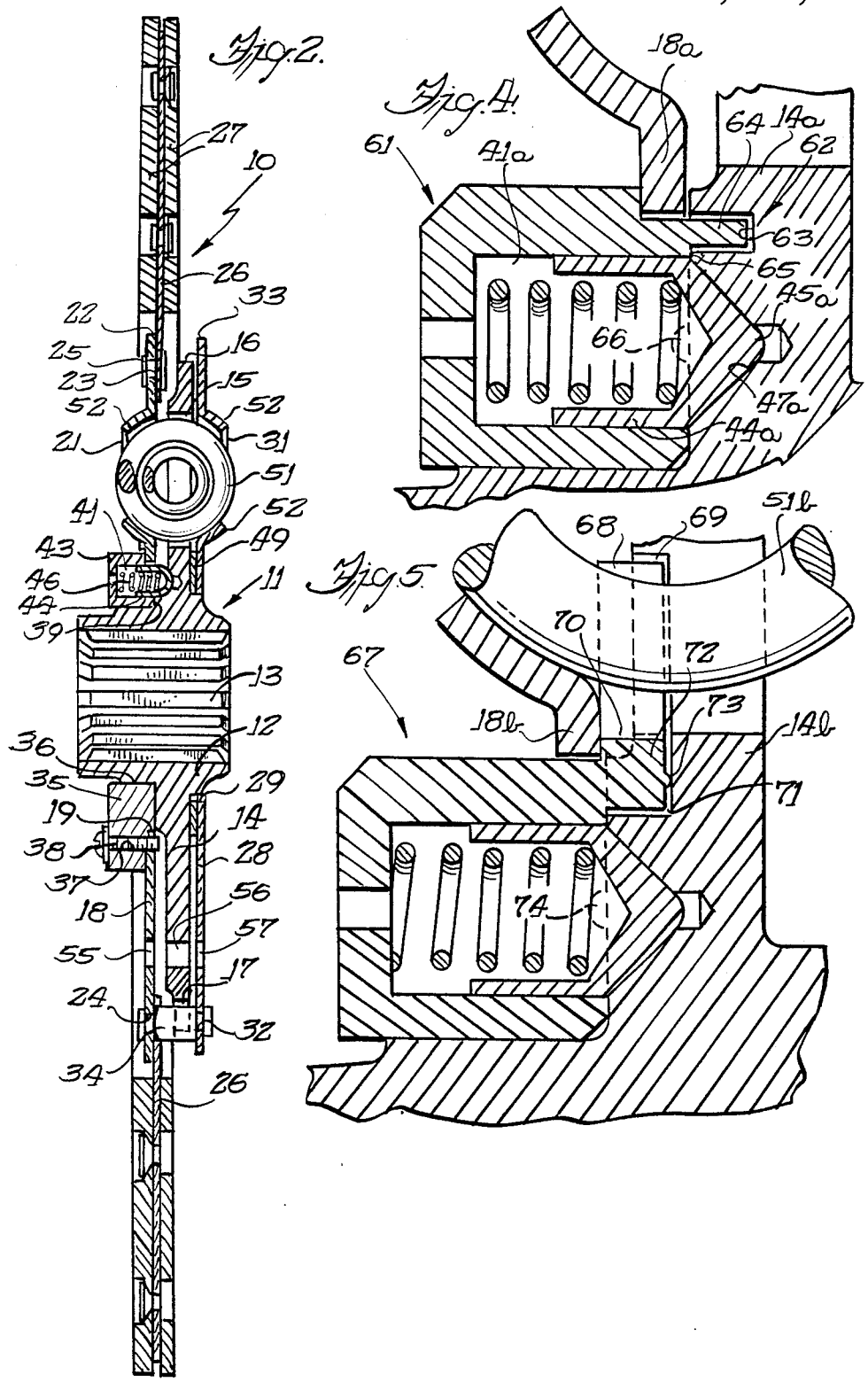

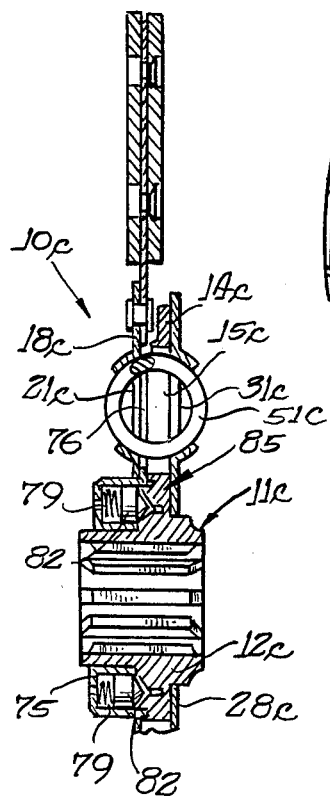
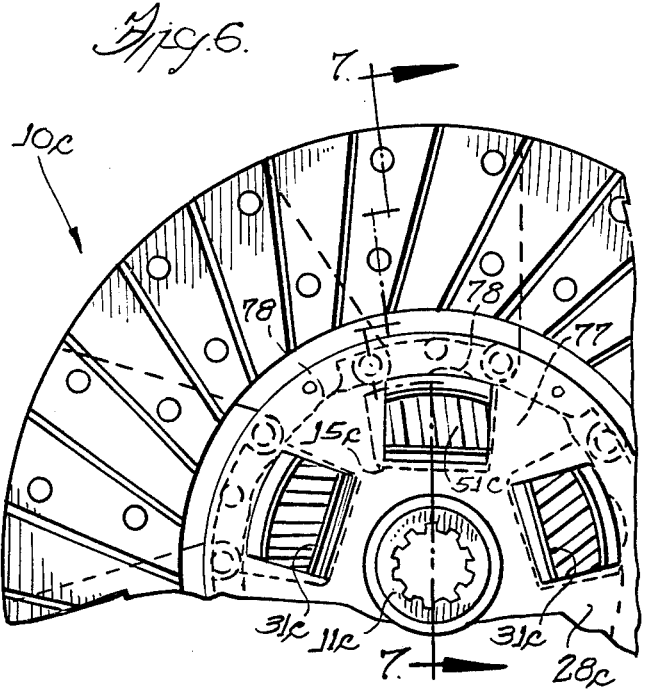
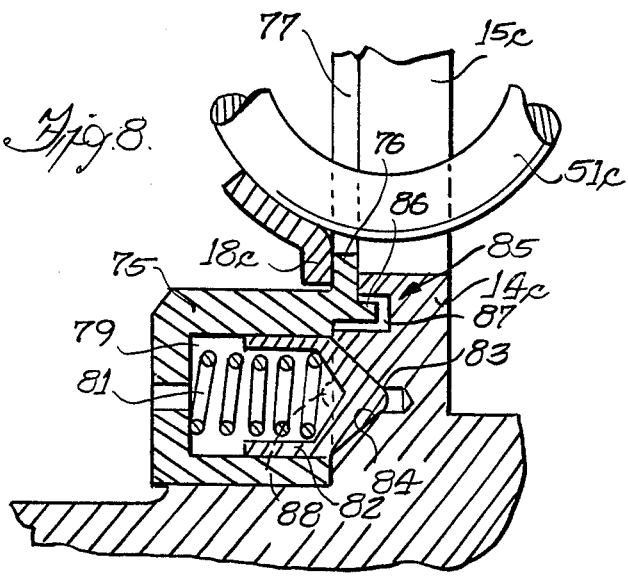

CLUTCH DRIVEN PLATE ASSEMBLY

BACKGROUND OF THE INVENTION

In a conventional friction clutch for a manual transmission in an automotive vehicle, the engine has power and inertia impulses which drive the engaged clutch with an irregular series of thrusts when the transmission is in neutral and the engine is at idle rpm. These impulses will be transmitted to the transmission gears which become excited, resulting in oscillation through their backlash space to produce objectionable rattle. In my copending application Ser. No. 212,925, now U.S. Pat. No. 4,446,955, I disclose a driven plate assembly utilizing a helical connection between an inner hub and an outer hub to allow relative axial movement between the hubs to dissipate the engine impulses. The present invention relates to another approach to this problem to simplify construction of the clutch assembly.

SUMMARY OF THE INVENTION

The present invention comprehends the provision of a clutch driven plate assembly having a novel low friction piloting means between the hub and clutch driven plate to dissipate engine impulses which had previously resulted in objectionable transmission gear rattle with the clutch engaged, the transmission in neutral and the engine at idle rpm. The hub and drive plate arrangement includes a hub barrel in operative engagement with the transmission input shaft and having an integral radial flange with enlarged spring windows relative to the spring windows formed in the clutch driven and spring retainer plates; the clutch plate carrying the clutch friction facings at its periphery. The low friction piloting means includes a retainer rotatable with the clutch plate and containing resiliently biased plungers which move axially to act as detents in recesses formed in the hub flange. The resiliently biased plungers are cammed out of the recesses during the initial rotational travel of the clutch plate and damper springs allowed by the enlarged spring windows in the hub flange.

The present invention also comprehends the provision of a clutch driven plate assembly having a novel low-friction piloting means including a hub having an integral flange with enlarged spring windows for both the drive and coast directions relative to the windows in the clutch and spring retainer plates, and a retainer secured to the clutch plate and housing axially resiliently biased plungers urged into engagement with complementary recesses in the hub flange; the retainer being rotationally adjustable relative to the clutch driven plate.

The present invention further comprehends the provision of a clutch driven plate assembly including a hub with an integral flange, a retainer operatively connected to a clutch driven plate forming a low-friction piloting means with resilient detent means, and a labyrinth seal in the piloting means cooperating with a lubricant reservoir to prevent migration of the lubricant out of the detent area.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is a cross sectional view of the assembly taken on the irregular line 2—2 of FIG. 1.

FIG. 4 is an enlarged partial cross sectional view of a second embodiment of low friction piloting means having a labyrinth seal therein.

FIG. 5 is an enlarged partial cross sectional view similar to FIG. 4 but showing an embodiment of ablative seal.

FIG. 6 is a partial rear elevational view with portions broken away of a clutch driven plate assembly utilizing a third embodiment of seal for the retainer.

FIG. 7 is a partial cross sectional view taken on the irregular line 7—7 of FIG. 6.

FIG. 8 is an enlarged partial cross sectional view similar to FIG. 4 showing the embodiment of labyrinth seal and lubricant reservoir of FIGS. 6 and 7.

DESCRIPTION OF THE PREFERRED EMBODIMENTS

Figure 1:
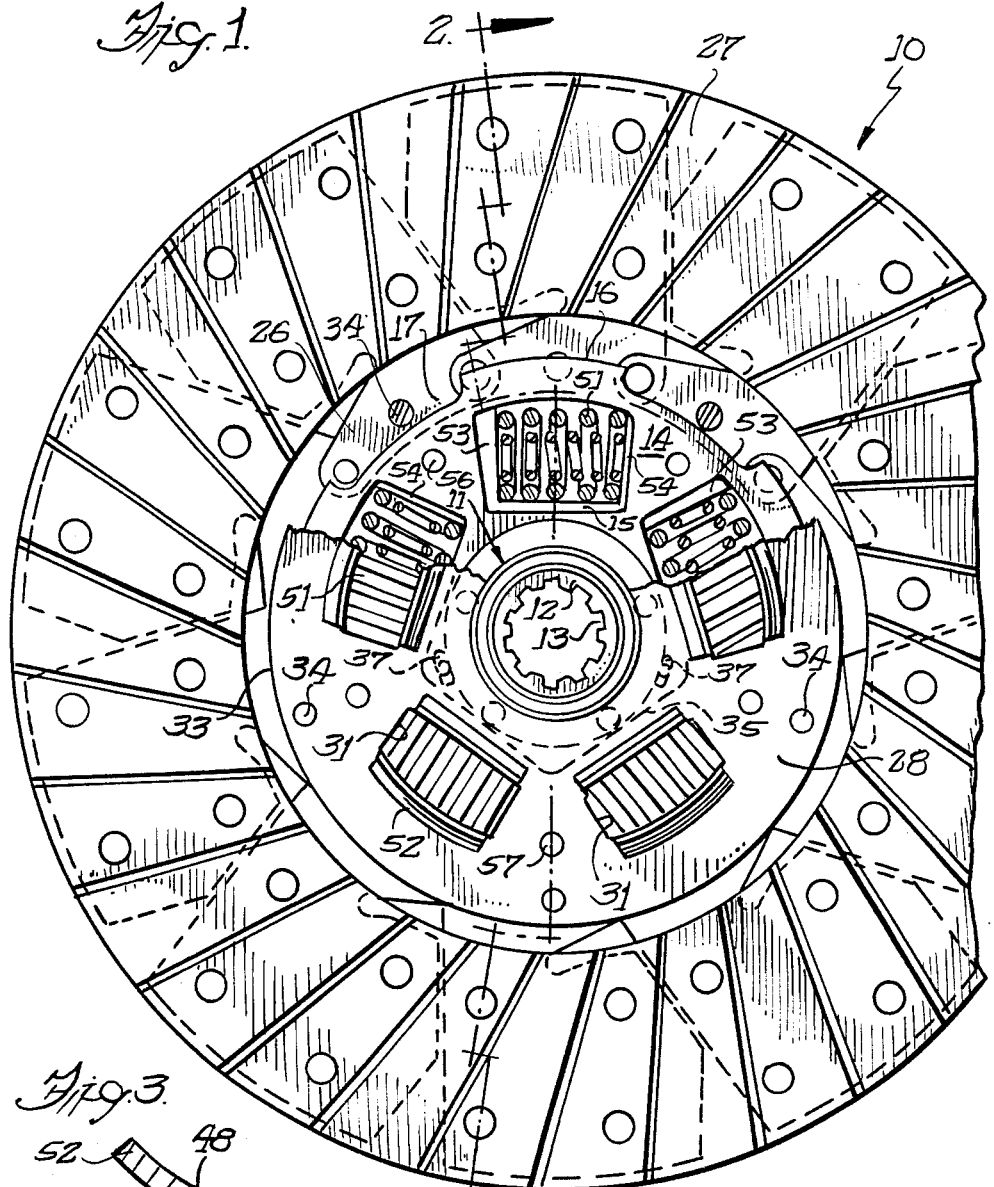
FIG. 1 is a rear elevational view of a clutch driven plate assembly embodying the present invention.
Figure 3:
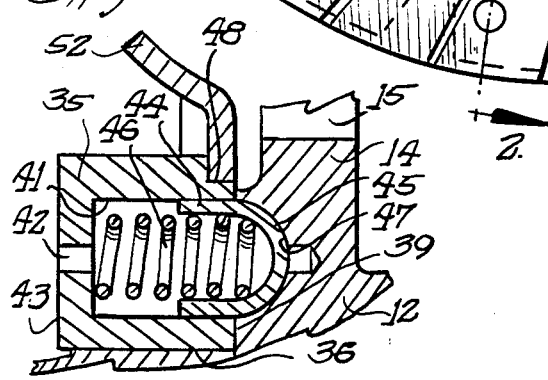
FIG. 3 is an enlarged partial cross sectional view of the low friction piloting means cooperating with the clutch driven plate and hub.

Referring more particularly to the disclosure in the drawings wherein are shown illustrative embodiments of the present invention, FIGS. 1 through 3 disclose a clutch driven plate assembly 10 including a hub member 11, a clutch plate 18 carrying friction facings 27 mounted on the periphery thereof and adapted to be positioned between friction surfaces of a flywheel and a pressure plate (not shown) for the vehicle clutch, and a spring retainer plate 28. The hub member 11 includes a barrel 12 with a splined central opening 13 receiving the splined end of a transmission input shaft (not shown), and an integral radial flange 14 having a plurality of circumferentially equally spaced arcuate spring windows 15 and terminating in a periphery 16 having a plurality of circumferentially equally spaced elongated notches 17.

The clutch driven plate 18 has a central opening 19, a plurality of circumferentially equally spaced spring windows 21, and an outer periphery 22 containing a plurality of openings 23 and 24 arranged in a circle; the openings 23 receiving rivets 25 to secure cushioning plates 26 carrying the opposed friction facings 27 for the clutch secured thereto.

The spring retainer plate 28 (FIGS. 1 and 2) has a central opening 29, a plurality of circumferentially equally spaced arcuate spring windows 31 axially aligned with the windows 15 and 21 of the hub flange and clutch plate, respectively, and a plurality of openings 32 in its periphery 33 axially aligned with openings 24 to receive spacer rivets 34 securing the clutch plate 18 and spring retainer plate 28 together; the rivets extending through the elongated notches 17 in the hub flange periphery.

Journalled on the hub barrel 12 is a generally polygonal retainer 35 having a central opening 36 receiving the hub barrel 12 and several arcuate slots 37 located in the apices of the polygon to receive screws 38 extending therethrough to threadingly engage in openings formed in the inner periphery of the clutch driven plate. Formed in the rear face 39 of the retainer are a plurality of circumferentially equally spaced cylindrical recesses 41, each terminating in a reduced diameter passage 42 opening into the front face 43. Received in each recess is a cylindrical plunger or detent 44 having a rounded end or nose 45 biased by a compression spring 46 in each recess into engagement with a complementary rounded recess 47 in the facing surface of the hub flange 14. The retainer is shouldered at 48 to be received in central openings 19 of the clutch plate 18. As seen in FIG. 2, a friction washer 49 may be located between the hub flange 14 and spring retainer plate 28 if additional frictional lag force is desired.

One or more concentric damper springs 51 are located in each aligned set of spring windows 21, 15 and 31 in the plates and hub flange, with the plate windows 21 and 31 having inclined lips 52 to retain the springs in operative position. As seen in FIG. 1, the spring windows 15 in the hub flange 14 are enlarged relative to the clutch and spring retainer plate windows in the drive direction at 53 and by a smaller amount in the coast direction at 54. The function of the enlarged windows will become more apparent when considering operation of the assembly.

In the normal position of the hub assembly with the clutch disengaged, as seen in FIGS. 2 and 3, the plungers 44 are resiliently biased into engagement in the complementary recesses 47 in the hub flange. This clutch assembly operates in the same manner as a conventional assembly except for the action of the plungers in the retainer at idle rpm and in neutral transmission position. With the clutch plate engaged between the flywheel and pressure plate, the engine impulses during idle act to rotate the clutch plate 18, spring retainer plate 28 and damper springs 51 relative to the hub and flange due to the enlarged portion 53 of the spring windows 15, and rotation of the clutch plate results in rotation of the retainer 35, causing the plungers 44 to cam out of the recesses 47 in the hub flange against the force of the compression springs 46 to produce a resilient cushioning and prevent gear rattle. Movement continues until the damper springs strike the ends of the enlarged portions 53 of the hub flange spring windows. The energy of the impulses is used to actuate the plungers in the above manner rather than transmit the undiminished impulses to the vehicle transmission to cause its gears to rattle.

In the normal driving mode of the vehicle, the hub 11 rests against the damper springs 51 to compress them upon torque application to the friction facings, which will dampen the vibrations of the drive train in a conventional manner. The openings 55, 56, 57 in the clutch plate, hub flange and spring retainer plate, respectively, are positioned to align the hub with the clutch driven plate for assembly and adjustment purposes.

FIG. 4 discloses an alternate embodiment of retainer 61 similar to that of FIGS. 1 through 3 which is adjustably secured to the clutch plate 18a and has each axial recess 41a housing a plunger or detent 44a having a rounded nose 45a received in a recess 47a in the hub flange 14a. A labyrinth seal 62 is provided between the hub and retainer 61 and comprises an annular groove 63 formed in the hub flange 14a to receive an annular protrusion 64 formed on the rear face 65 of the retainer. An annular groove 66 in retainer face 65 acts as a reservoir for a suitable lubricant at the detent area, with the labyrinth seal 62 acting to prevent migration of the lubricant out of the detent area.

In FIG. 5, a third embodiment of retainer 67 is disclosed providing an ablative seal. This retainer is generally annular and not secured to the clutch driven plate 18b, but has a radial flange 68 located within a recess 69 in the hub flange 14b positioned between the clutch plate and hub flange. The flange terminates in a peripheral edge having notches 70, each of which closely encompasses a damper spring 51b in its uncompressed state. The hub flange also has an annular groove 71 receiving an annular ring 72 projecting rearwardly from the retainer flange with a raised ridge 73 which is installed with interference with the hub flange and quickly wears to provide a line-to-line seal to prevent migration of lubricant from the detent area. A groove 74 in the rear face of the retainer 67 provides a lubricant reservoir. As the retainer 67 engages the normal damper springs 51b, this causes the retainer to become loose in the assembly and not operate when the damper springs are deflected in the normal driving mode.

FIGS. 6 through 8 disclose a clutch driven plate assembly 10c which is similar to FIGS. 1 and 2 except for the labyrinth seal 85. The assembly includes a hub 11c having a barrel 12c and radial flange 14c, a clutch driven plate 18c and spring retainer plate 28c secured together in spaced relationship sandwiching the hub flange 14c, and a generally annular retainer 75 having an integral radial flange 76 between the clutch plate and hub flange with spring windows 77 normally axially aligned with the spring windows 21c, 15c and 31c of the clutch plate, hub flange and spring retainer plate, respectively. The outer periphery of this flange is generally circular with equally spaced arcuate humps 78. A plurality of rearwardly facing circumferentially equally spaced recesses 79 are formed in the retainer to receive compression springs 81 and plungers or detents 82 with rounded noses 83 received in complementary recesses 84 in the hub flange. A labyrinth seal 85 consists of an annular protrusion 86 extending rearwardly from the retainer received in a complementary annular groove 87 formed in the hub flange. The retainer also has an annular groove 88 interrupted by the recesses 79 which holds a supply of lubricating grease at the detents. As noted in the previous embodiment, this retainer engages the normal damper springs 51c, which causes the retainer to become loose in the assembly and not operate when the damper springs are deflected in the normal driving mode.

I claim:

1. In a clutch driven plate assembly for an automotive vehicle clutch driving a transmission input shaft, including a hub having a barrel splined onto the input shaft and a radial flange, a clutch plate carrying friction facings at the outer periphery thereof, a spring retainer plate secured to the clutch plate to sandwich said hub flange therebetween, said plates and hub flange having axially aligned sets of circumferentially spaced windows therein, and damper springs received in each set of windows, the improvement comprising a retainer operatively connected to said clutch plate to rotate therewith and having a plurality of recesses facing said hub flange, a plurality of axially biased plungers received in said recesses, and a series of camming recesses in said hub flange axially aligned with said recesses to receive said plungers, said hub flange windows extending circumferentially beyond said plate spring windows to allow limited rotation of said plates relative to said hub without compression of said damper springs so that rotation of said plates and retainer relative to said hub causes said plungers to cam out of said hub flange recesses.

2. A clutch driven plate assembly as set forth in claim 1, wherein said retainer recesses each house a plunger and a compression spring.

3. A clutch driven plate assembly as set forth in claim 1, wherein said retainer has circumferentially spaced arcuate slots receiving screws threadingly engaging said clutch plate to adjustably secure said retainer and clutch plate together.

4. In a clutch driven plate assembly for an automotive vehicle clutch driving a transmission input shaft, including a hub having a barrel splined onto the input shaft and a radial flange, a clutch plate carrying friction facings at the outer periphery thereof, a spring retainer plate secured to the clutch plate to sandwich said hub flange therebetween, said plates and hub flange having axially aligned sets of circumferentially spaced windows therein, and damper springs received in each set of windows, the improvement comprising a retainer having a generally polygonal periphery with circumferentially spaced arcuate slots positioned adjacent the apices thereof and receiving screws threadingly engaging said clutch plate to adjustably secure said retainer and clutch plate to rotate together, a plurality of axially biased plungers in said retainer, and a series of camming recesses in said hub flange receiving said plungers, said hub flange windows extending circumferentially beyond said plate spring windows so that rotation of said plates and retainer relative to said hub causes said plungers to cam out of said hub flange recesses.

5. In a clutch driven plate assembly for an automotive vehicle clutch driving a transmission input shaft, including a hub having a barrel splined onto the input shaft and a radial flange, a clutch plate carrying friction facings at the outer periphery thereof, a spring retainer plate secured to the clutch plate to sandwich said hub flange therebetween said plates and hub flange having axially aligned sets of circumferentially spaced windows therein, and damper springs received in each set of windows, the improvement comprising a retainer operatively connected to said clutch plate to rotate therewith and having a plurality of axially biased plungers therein, a series of camming recesses in said hub flange receiving said plungers, and a labyrinth seal located between said retainer and hub flange, said hub flange windows extending circumferentially beyond said plate spring windows so that rotation of said plates and retainer relative to said hub causes said plungers to cam out of said hub flange recesses.

6. A clutch driven plate assembly as set forth in claim 5, wherein said labyrinth seal comprises an annular protrusion on the retainer, said hub flange having an annular groove receiving said protrusion.

7. A clutch driven plate assembly as set forth in claim 6, wherein an annular groove is formed in said retainer interconnecting said plunger recesses and acting as a lubricant reservoir.

8. A clutch driven plate assembly as set forth in claim 7, in which said lubricant groove is formed on the rear surface of said retainer in sliding contact with said hub flange.

9. A clutch driven plate assembly as set forth in claim 5, wherein said retainer has an integral flange located between the clutch plate and hub flange and having windows adapted to encompass said damper springs.

10. In a clutch driven plate assembly for an automotive vehicle clutch driving a transmission input shaft, including a hub having a barrel splined onto the input shaft and a radial flange, a clutch plate carrying friction facings at the outer periphery thereof, a spring retainer plate secured to the clutch plate to sandwich said hub flange therebetween, said plates and hub flange having axially aligned sets of circumferentially spaced windows therein, and damper springs received in each set of windows, the improvement comprising a retainer operatively connected to said clutch plate to rotate therewith and having a plurality of axially biased plungers therein, a series of camming recesses receiving said plungers, and an ablative seal located between said retainer and hub flange, said hub flange windows extending circumferentially beyond said plate spring windows so that rotation of said plates and retainer relative to said hub causes said plungers to cam out of said hub flange recesses.

11. A clutch driven plate assembly as set forth in claim 10, in which said ablative seal includes an annular projection on said retainer and a small annular ridge on said projection, said hub flange having an annular groove receiving said projection.

12. A clutch driven plate assembly as set forth in claim 11, in which said annular ridge is installed with interference to provide a line-to-line contact upon wear.

13. A clutch driven plate assembly as set forth in claim 12, including a radial flange on said retainer positioned between the clutch plate and hub flange and having peripheral notches encompassing the damper springs.

* * * * *